(No Model.) 6 Sheets—Sheet 1.

W. H. JACKSON.
MACHINE FOR MAKING HAIR PINS.

No. 356,539. Patented Jan. 25, 1887.

WITNESSES:
Fredk. F. Campbell.
W. F. Zimmermann.

INVENTOR:
William H. Jackson,
BY Drake & Co. ATT'YS (No Model.) 6 Sheets—Sheet 1

W. H. JACKSON.
MACHINE FOR MAKING HAIR PINS.

No. 356,539. Patented Jan. 25, 1887.

WITNESSES:
Fredk. F. Campbell
W. F. Zimmermann

INVENTOR:
William H. Jackson,
BY Drake & Co. ATTYS.

(No Model.) 6 Sheets—Sheet 3.

W. H. JACKSON.
MACHINE FOR MAKING HAIR PINS.

No. 356,539. Patented Jan. 25, 1887.

WITNESSES:
Fredk. F. Campbell
H. A. Zimmermann

INVENTOR:
William H. Jackson,
BY Drake & Co., ATTYS.

(No Model.) 6 Sheets—Sheet 4.

W. H. JACKSON.
MACHINE FOR MAKING HAIR PINS.

No. 356,539. Patented Jan. 25, 1887.

WITNESSES:
Frdk. F. Campbell
H. F. Zimmermann

INVENTOR:
William H. Jackson,
BY Drake & Co, ATTYS.

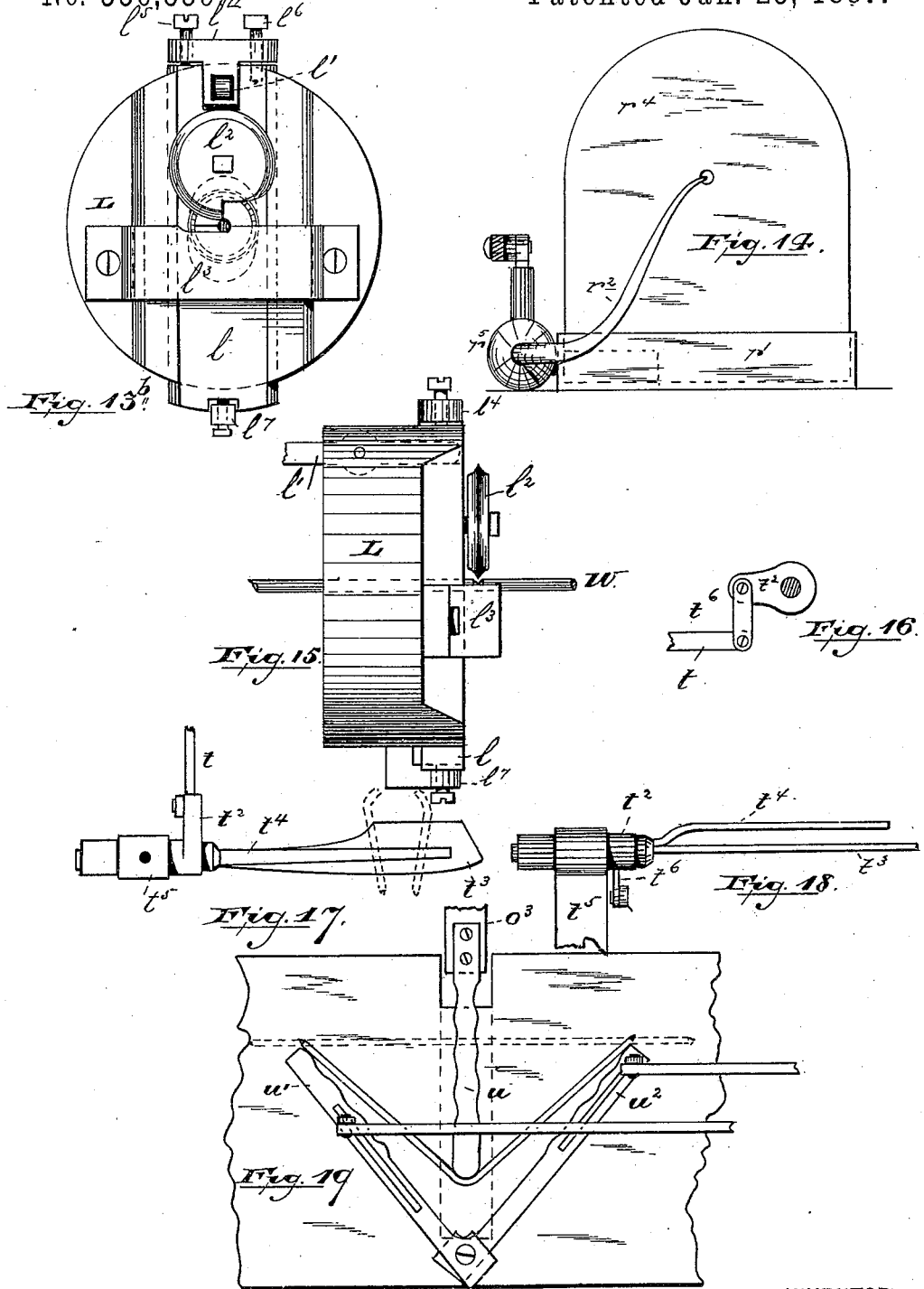

(No Model.) 6 Sheets—Sheet 6.

W. H. JACKSON.
MACHINE FOR MAKING HAIR PINS.

No. 356,539. Patented Jan. 25, 1887.

WITNESSES: Frdk. F. Campbell. M. G. Heath.

INVENTOR: William H. Jackson,
BY Drake & Co., ATTYS.

UNITED STATES PATENT OFFICE.

WILLIAM H. JACKSON, OF ELIZABETH, NEW JERSEY.

MACHINE FOR MAKING HAIR-PINS.

SPECIFICATION forming part of Letters Patent No. 356,539, dated January 25, 1887.

Application filed December 17, 1885. Serial No. 185,907. (No model.)

*To all whom it may concern:*

Be it known that I, WILLIAM H. JACKSON, a citizen of the United States, residing at Elizabeth, in the county of Union and State of New Jersey, have invented certain new and useful Improvements in Machines for Making Hair-Pins; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
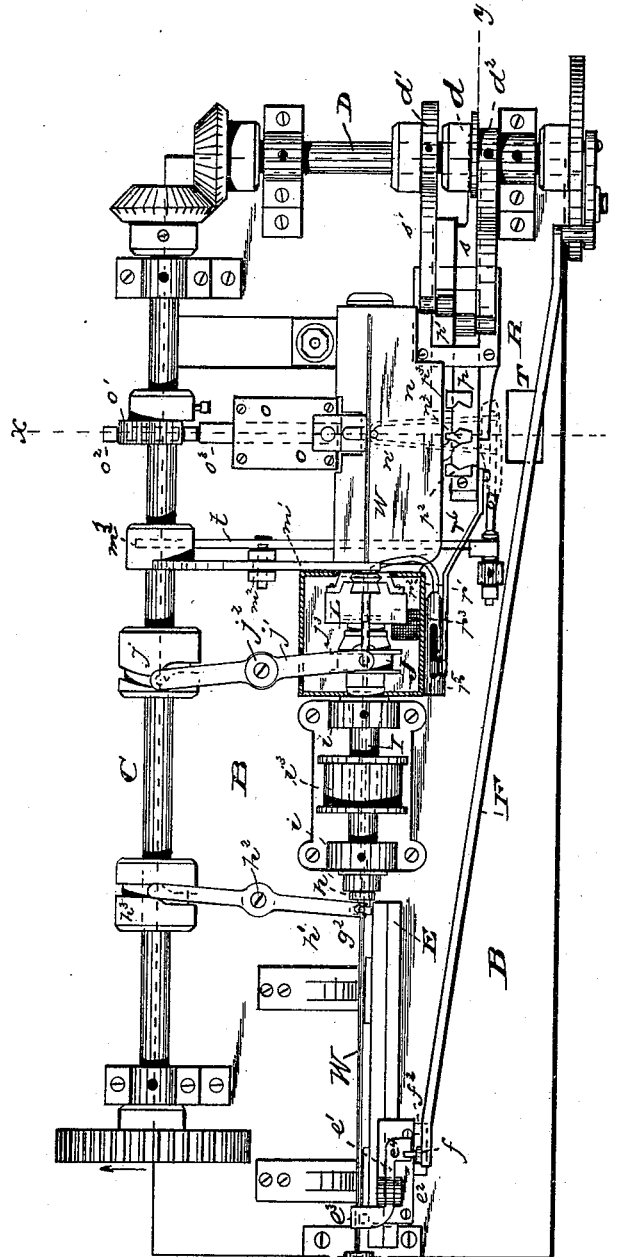
Figure 2:
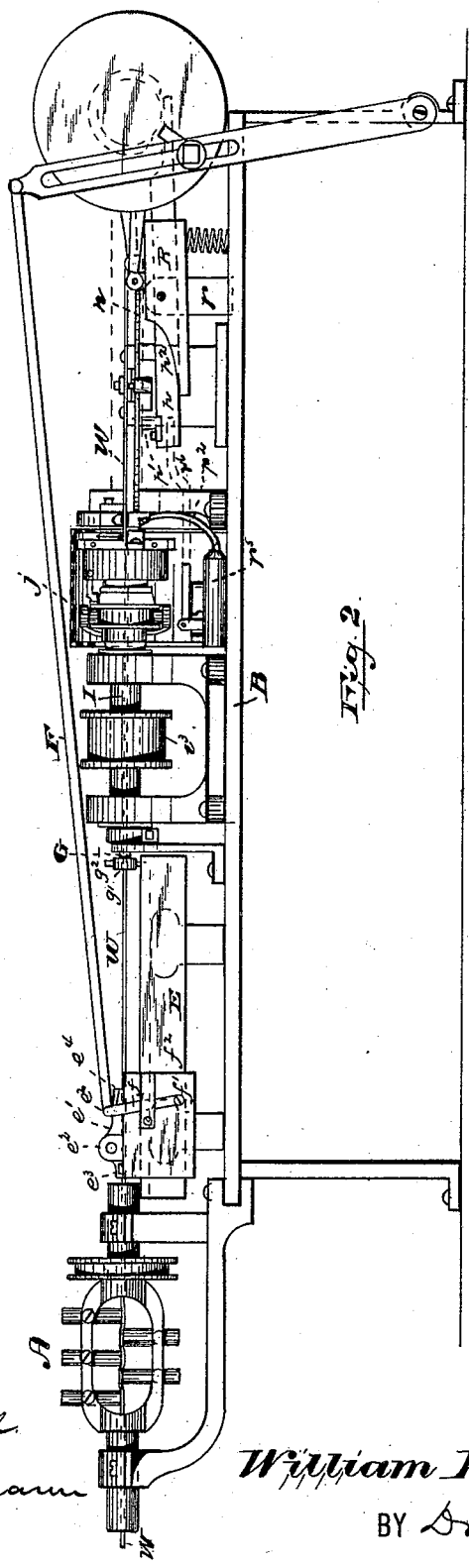
Figure 3:
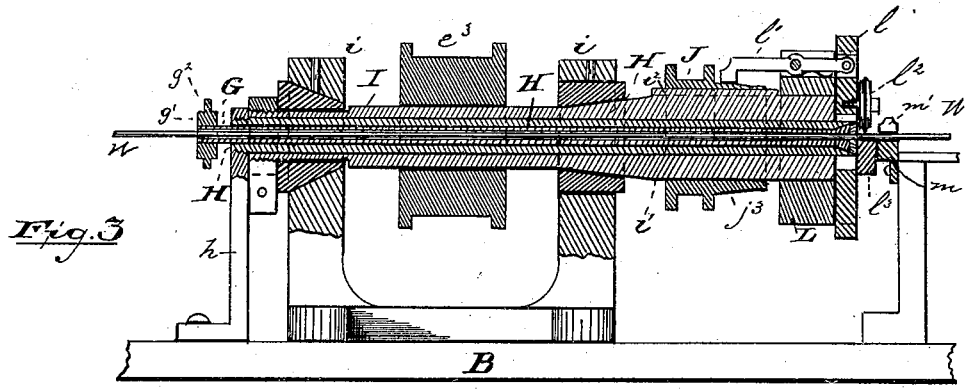
Figure 4:
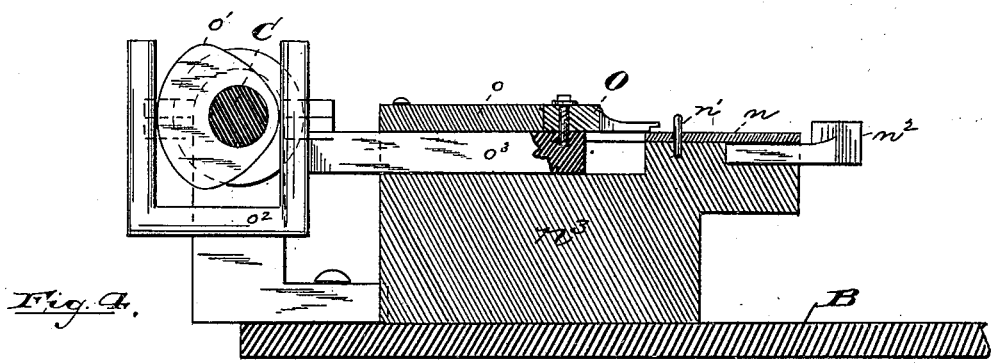
Figure 5:
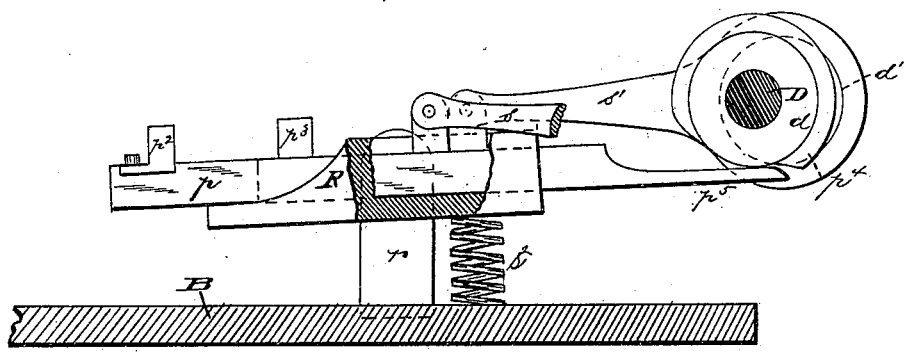
Figure 6:
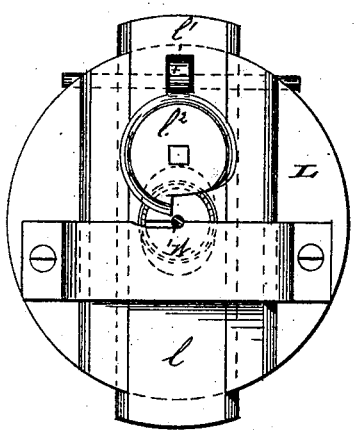
Figure 7:
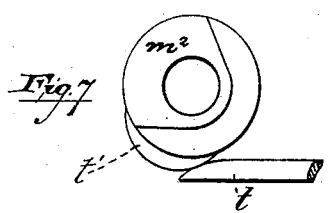
Figure 9:
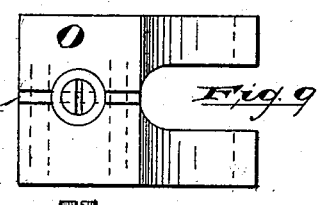
Figure 8:
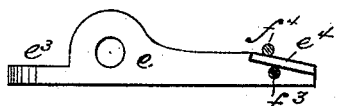
Figure 10:
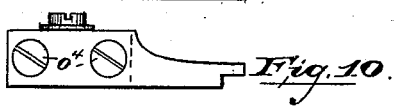
Figure 11:
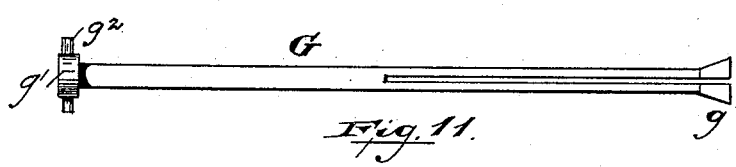
Figure 12:
Figure 21:
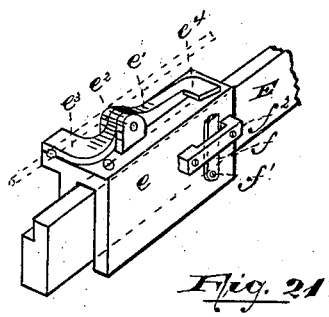
Figure 22:
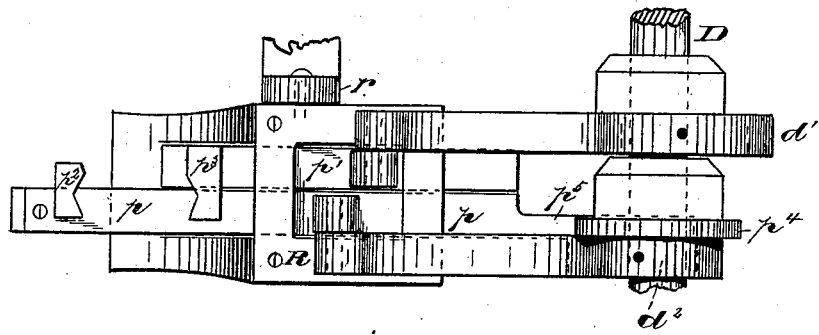
Figure 23:
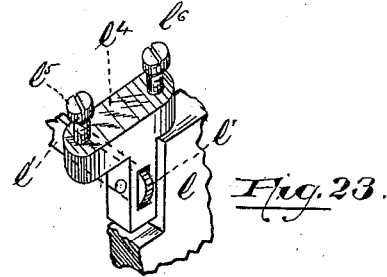

Of the various views of the drawings, embodied in six sheets, which are selected to illustrate the invention, Figure 1 is a plan thereof. Fig. 2, Sheet 2, is a side elevation of the same, in which certain portions of the mechanism—viz., the driving-shaft, cams, &c.—are omitted for the sake of clearness of illustration. On Sheet 3, Fig. 3 is a longitudinal section taken vertically and centrally through the wire holding and cutting mechanism. Fig. 4 is a section on the line $x$, Fig. 1, through the wire-bending mechanism. Fig. 5 is a view taken through line $y$, Fig. 1, being partly in elevation and section. Fig. 6, Sheet 4, is a front elevation of the rotating cutter-head. Fig. 7 is a similar view of the cam that controls the wire-holding lever. Fig. 8 is a side elevation of the wire-clamping lever on the feeding mechanism. Figs. 9 and 10 are a plan and side elevation of the bending fork. Fig. 11 is a side elevation of the tubular chuck. Fig. 12 is a view of the completed hair-pin, and Fig. 13$^a$ is a sectional view indicating a modification of the end of the tubular chuck, &c. On Sheet 5, Fig. 13$^b$ is a front elevation of the cutter-head, illustrating certain additional features of the same. Fig. 14 is a front elevation of the oil-tank covering and pump. Fig. 15 is a side elevation of the cutter-head shown in Fig. 13$^b$. Fig. 16 is a side view of the connecting-link of the tripping mechanism. Figs. 17 and 18 are a plan and side elevation of the tripping-fork. Fig. 19 is a plan of a modified construction of the bending and shaping mechanism, and Fig. 20 is a view of a corrugated hair-pin. On Sheet 6, Fig. 21 is a perspective view of the reciprocating wire-feeding device. Fig. 22 is a plan of the shaping-dies and their operating mechanism, shown in Fig. 5 in elevation; and Fig. 23 is a perspective view of an adjustable piece which is attached to the top of the reciprocating tool-plate, a portion of which is shown in said view.

Similar reference-letters indicate like parts in each of the several views.

The purpose of this invention is to provide a machine in which all of the various operations of preparing or straightening the wire, of feeding the same, cutting off sufficient wire to form the pin, pointing said wire, and bending and shaping the wire into a hair-pin are automatically and effectively performed without any handling of the wire by the operator, the wire being automatically fed to the machine and the completed hair-pin automatically delivered therefrom.

The invention consists of mechanism constructed and adapted to automatically perform all of the various steps in forming hair-pins, said mechanism being illustrated in the drawings, and described and claimed hereinafter.

In the drawings, Figs. 1 and 2, the wire-straightening mechanism A is shown attached to the bed of the pin-making mechanism proper, at a point adjacent to the feeding mechanism the wire passing through the straightening device before being fed to the cutting mechanism. Any suitable device for straightening the wire in lieu of that shown in the drawings may be employed, as this forms no essential part of the invention.

B indicates the bed of the machine, upon which the several operating portions of the mechanism are secured; C, the driving-shaft, and D a shaft receiving its power from the said driving shaft, which operates the pin-shaping mechanism, and also the wire-feeding device.

In the wire-feeding mechanism, E represents the way upon which the carriage $e$ slides reciprocally. $e'$ is a lever pivoted to the standards $e^2$ on the carriage, one end of which, $e^3$, engaging with the carriage or a projecting part thereof, grips and holds the wire during the forward movement of the carriage. The other end, $e^4$, of the lever is constructed and arranged in relation to the connecting-rod F and the parts secured thereto and the carriage so as to cause in their operation the opposite end, $e^3$, to seize the wire W as the carriage moves forward to feed the said wire to the cutting mechanism, and to release the said wire as the carriage moves backward.

By reference to Figs. 1, 2, and 8 the construction of the device whereby the wire is alternately seized and released will be more clearly apprehended. In said figures the end of the connecting-rod F is shown to be pivoted to an arm, $f$, which is in turn pivotally secured to the carriage at $f'$, and moves to and fro in a bracket, $f^2$, on the carriage.

Projecting from the arm $f$, and engaging with the upper and lower sides of an inclined plate or projection on the end $e^4$ of the clamping-lever, are pins $f^3$ and $f^4$. At the beginning and end of the reciprocating motion of the carriage there is a slight movement of the connecting-rod and lever $f$, a forward movement at the beginning of the forward stroke of the carriage, and a backward movement at the beginning of the backward stroke of the same. The result of this is that the pin $f^3$ at the beginning of the forward stroke engages the under side of the inclined plate $e^4$, and, raising one end of the lever, depresses the opposite end, $e^3$, thereof, which grips the wire. When this is done the carriage moves forward, carrying the wire with it. At the beginning of the backward movement the reverse of this operation takes place. The pin $f^4$ engages the upper side of the inclined plate, and, depressing one end of the lever, raises the clamping end and releases the wire, thereby permitting the carriage and jaws to move backward clear of the wire. As above stated, the wire passes through the wire holding and cutting devices, which consist of an inner reciprocally-moving tubular chuck, G, a stationary tube, H, surrounding the said chuck, an outer revolving spindle, I, a sliding collar, J, a cutter-head, L, revolving concentrically around the wire, having a cutting-tool, $l^2$, that moves toward and from the wire, and co-operating devices, which will be explained in detail hereinafter.

Figure 13:
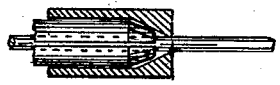

The chuck G or innermost tube through which the wire directly passes is illustrated more particularly in Figs. 3 and 11, and consists of a split tube, one end of which is beveled or inclined, either as indicated in Fig. 13ª or in Figs. 3 and 11, at $g$. On the other end is secured a collar, $g'$, having pins $g^2$ projecting oppositely therefrom. The stationary tube H is immovably secured to the standard $h$, and is bored to conform to the shape of the innermost tube, having an inclined or beveled end on the inside thereof conforming to the inclines on the chuck. The purpose of these inclines is as the chuck is drawn backward within the tube, when the construction shown in Figs. 3 and 11 is used, or pushed forward, when the ends are made as indicated in Fig. 13ª, to cause the split end of the chuck to close upon the wire and hold the same firmly. This longitudinal or reciprocal movement of the chuck is caused by the lever $h'$, pivoted to a standard, $h^2$, one end of said lever engaging with the pins on the collar $g'$ on the chuck, the opposite end of the said lever engaging with and receiving its motion from a cam, $h^3$, keyed on the driving-shaft.

Around the stationary tube revolves the spindle I, journaled in the standards $i$ and formed preferably as more clearly indicated in Fig. 3, having an enlarged end, $i'$, upon which a sliding collar, J, moves reciprocally, being prevented from turning on the spindle by a feather, $i^2$, which also causes the said collar to turn with the spindle. The sliding movement of the collar is imparted thereto from the cam $j$ on the main shaft through the bifurcated lever $j'$, pivoted to the standard $j^2$. The said collar is constructd as indicated, being grooved to receive the pins on the bifurcated lever and inclining from said groove toward the opposite end, forming a bevel, $j^3$, the purpose of which will be described hereinafter.

A pulley, $i^3$, is keyed on the spindle, which is caused to rotate at a very high rate of speed independently of the other mechanism. To the end of the spindle, and turning therewith, is secured the rotating cutter-head L, in which, preferably in the face thereof, is arranged a tool carrying plate, $l$, which has a reciprocal motion toward and from the axis of revolution or center of the revolving head, and extends preferably, but not necessarily, entirely across the face of the head, as indicated in Figs. 3, 6, &c.

The plate $l$ is slotted to permit the end of the stationary tube and chuck to project out to the face of said plate and still not to interfere with the free movement of the plate.

The movement of the tool-plate is produced by the lever $l'$, pivoted in the top of the head, one end of which is secured pivotally to said plate and the other end bearing on the bevel $j^3$ on the collar, and, moving up and down said bevel as the collar slides reciprocally, causes the action of said plate.

To the tool plate is secured the cutter $l^2$, which in the drawings is shown to be adapted to double point the ends of the severed wire while separating the same.

Under some conditions it is necessary to adjust the sliding tool-plate to regulate the cutting of the wire.

In Figs. 13ᵇ and 15 is indicated a means of accomplishing this result, in which a T-piece, $l^4$, is inserted into the top of the slide and the lever $l'$ is pivoted in the said piece $l^4$ instead of in the slide itself, as shown in Fig. 6, the adjustment being effected by the set-screws $l^5$ $l^6$ in said piece and by the set-screw in the arm $l^7$ at the bottom of the slide.

Across the face of the head is a bed, $l^3$, which supports the wire while being severed, and contiguous thereto is a stationary support, $m$, across which the wire extends and upon which it is firmly held during the cutting of the wire by the lever $m'$, which is pivoted to the standard $m^2$ and is operated by the cam $m^3$ on the driving-shaft.

The cam $m^3$, which controls the movement of the lever $m'$, and the cam $h^3$, that causes the closing of the chuck upon the wire, are intended to be so arranged and timed that both operations take place simultaneously, in consequence of which the wire is firmly held at two points, one on each side of the cutting-tool, so that when the tool is depressed by the action of the sliding collar and severs the wire there is no possibility of the cut being imperfect because of the slipping or bending of the wire.

Both of the holding devices are stationary on each side of the cutting-point, the head rotating around the split tube and the parts co-operating therewith, which extend out to the face of the head and tool-plate, and the second stationary holding device being placed close to the head and tool-plate, so that only sufficient length of wire is left between the holding devices to permit the severing thereof by the cutting-tool. This close arrangement of the chuck and holding-lever is permitted by arranging the tool-plate in the face of the rotating head, as shown in the drawings.

The mechanism for bending the wire into the ordinary straight hair-pin and forming the same into any peculiar form (two illustrations of which are given in Figs. 12 and 20) is arranged adjacent to the cutting mechanism, and consists of independent but co-operating groups of mechanical devices, which are illustrated in Figs. 4, 5, 9, and 10, and a modification thereof in Fig. 20. The bending devices shown in Figs. 4, 5, 9, and 10 consist of a bending-pin, $n'$, projecting from the table $n$ a little forward of the line of movement of the wire, as indicated in Fig. 1, and a fork, O, which moves at right angles to the line of the wire, the opening in the fork being in a line with the pin, upon each side of which the tines pass as the fork moves reciprocally.

The fork-actuating devices are more clearly illustrated in Figs. 4, and consist of a cam-eccentric, $o'$, on the driving-shaft that engages with the uprights of the frame $o^2$, formed integrally with the sliding arm $o^3$ to which the fork is secured. As indicated in Figs. 9 and 10, the fork may be formed in two parts held together by screws $o^4$, and a plate of any desired width inserted between the sides to increase the distance between the tines, whereby the fork may be accommodated to any thickness of wire.

The fork, pin, and the actuating mechanism co-operating therewith are adapted to form an ordinary straight hair-pin in common use. To produce a pin like that shown in Fig. 12, other mechanism is employed to co-operate with the bending device which is illustrated in Figs. 1, 2, and 5.

To operate the shaping mechanism a shaft, D, receiving its power from the main shaft, is arranged adjacent to the bending-table, having keyed thereon a cam, $d$, and cam-eccentrics $d'$ $d^2$, oppositely formed, whereby a contrary motion is produced in the sliding blocks $p$ $p'$ through the connecting-rods $s$ $s'$. The effect of this action is that the dies $p^2$ $p^3$, secured to the blocks $p$ $p'$, respectively, are caused to approach and recede from the stationary die $n^2$, secured to the standard $n^3$.

In order that the dies may seize the pin at the proper moment and still not interfere with the wire as it is bent to the form indicated by dotted lines on Fig. 1, it is necessary that the dies $p^2$ $p^3$ move not only toward and from the fixed die, but also rise and fall above and below the plane of the bending-table. This is accomplished by means of the rocking frame R, pivoted to the standard $r$, in which the blocks $p$ $p'$ slide, and which blocks partake of the movement of said rocker.

The rocking motion is caused by the cam $p^4$ on the shaft D, with which an extension, $p^5$, of one of the sliding blocks engages, as indicated in Fig. 5. In lieu of extending the sliding block, an arm may be formed or projected from the rocking frame itself and engage with said cam. The arm $p^5$ is held in contact with the cam $p^4$ by means of a spring, $s^2$, that is arranged between the bottom of the rocker and the bed B of the machine. The pin, having been bent and shaped, is upset or tripped and caused to drop through an opening, T, in the bed into a suitable receptacle.

The mechanism for automatically tripping the pins is shown in Fig. 1, and in enlarged views in Figs. 7, 16, 17, and 18, and consists of a lever, $t$, pivoted to the standard $m^2$ and operated by a cam, $t'$, on the cam $m^3$. The lever is attached to an arm, $t^2$, by a link, $t^6$, which is secured to the tripping-fork, having a broad lower tine, $t^3$, and a straight upper tine, $t^4$, the fork being journaled in the standard $t^5$.

The tripping mechanism is timed to operate immediately after the pin has been bent and shaped, at which time the perfect pin projects between the tines of the fork, as indicated in Fig. 17, and, actuated by the cam, lever, &c., said fork turns sufficiently toward the perpendicular to lift the pin and direct it toward the opening in the bed, through which it drops.

In Figs. 1, 2, and 14 is shown a device for lubricating the cutting-tool at the point of separation of the wire, which is provided with a pump, $r^5$, operated from the driving-shaft or through the slide $p$, as in Figs. 1 and 2, in which the said slide is shown to be connected with the pump by a rod, $r^6$, by which the oil is drawn from the tank $r'$ and forced through the tube $r^2$ upon the tool and wire, the oil dropping back into the tank, which is immediately beneath the cutter-head.

A strainer, $r^3$, is provided in the tank, through which the oil passes before it is drawn into the pump, to prevent the cuttings from being carried with the oil into the pump. The cover $r^4$ entirely incloses the rotating cutter-head and prevents the oil from scattering by the movement of the head.

The various operations are caused to take place successively, the wire-feeding mechanism pushing the wire into the chuck within the rotating spindle, and while the carriage is returning to the beginning of its movement the chuck and the holding-lever grip the wire and hold it firmly while the tool moves toward the wire, which the cutting-tool severs. By the time this operation is accomplished the feeding mechanism has seized the wire, and moves forward to supply more wire to the holding and cutting mechanism, and while this is taking place the length of wire which has been severed has been pushed forward upon the bending-table and the fork has begun its forward movement, bending the wire around the pin until it strikes the fixed die. The shaping-dies now seize the pin and complete the operation of forming the pin which the dies are designed to make. The action of the tripping-fork now removes the finished pin from the bending-table, to permit the bending of another length of wire, which, while the bending, shaping, and tripping mechanism are performing their work, has been fed, severed and double-pointed, and pushed out upon the bending-table.

When the ordinary straight hair-pin is made by this machine, the shaping portions thereof are dispensed with, the bending-fork and pin forming the finished hair-pin; but if it is desired to give the pin any peculiar form I employ co-operating mechanism to produce this result, one construction of said shaping mechanism adapted especially to form the ends of the hair-pin having been already described. As will be understood, the form of the dies varies according to the shape of pin desired.

Where a corrugated pin is desired, as is shown in Fig. 20, or where it is necessary to shape the pin throughout its entire length, the bending and shaping devices shown in Fig. 19 are considered preferable.

In bending the pin two methods may be adopted, one in which the wire is bent around a pin, as has been described, and the other in which the pin itself, or an equivalent thereof, moves, and the wire is drawn up and around the moving pin.

Fig. 19 is designed to illustrate one form of mechanism by which the latter method may be carried out. In said figure, $u$ indicates an elongated pin or die, and $u'$ $u^2$ clamping or shaping jaws, which are operated by oppositely-formed eccentrics similar to those that actuate the sliding blocks $p$ $p'$. The die $u$ may be operated by the arm $o^3$ and the same mechanism that causes the reciprocal movement of the fork and the sides thereof, and the inside of the jaws may be shaped so as to form a corrugated or otherwise shaped pin, according to the form desired. The normal position of the die $u$ is back of the line of the wire, which is indicated by the dotted lines on Fig. 19, and as the length of wire is pushed out upon the bending-table it falls between the ends of the die $u$ and the jaws $u'$ $u^2$. As the die moves forward, it engages the wire at the center and bends it, as indicated in the view illustrating this mechanism, the ends of the wire bearing against the jaws, which at the proper time approach the die and clamp the wire between the said jaws and the die, causing it to take the form of the clamping-surfaces. To remove the pin thus formed from the jaws, the table may be cut away under the die $u$, as indicated by the dotted lines on Fig. 19, and the pin when shaped allowed to drop through the opening; or in lieu of said opening other means of removing said pin analogous to the tripping device may be employed.

The device shown in Fig. 19 is not herein dedicated to the public, but is reserved to be the subject of another application to be made hereafter.

As it is not broadly new to bend wire around a projecting pin by means of oppositely-moving jaws, I do not lay claim to any means for bending the wire in this manner, as several forms of mechanism for accomplishing this result have been devised heretofore. In these devices, however, all of these bending-jaws are pivoted one to the other and bend the wire around the pin by moving toward the said pin from opposite directions, while in my bending mechanism the jaws or tines of the reciprocally-moving fork are fixed and rigid and bend the hair-pin wire around the projecting pin by pushing the wire against and around the same, the tines of the fork remaining stationary in relation to each other. This method of bending the wire can only be used with fine wire—such as that from which hair-pins are made—while the bending mechanism in the known devices above referred to is designed and adapted to bend very heavy wire used in making staples, &c., which is required to exert considerable power in its operation. As the reciprocating movement of the fork alone causes the bending of the wire, but very simple mechanism is necessary to produce this motion, while to produce the pivotal movement of the jaws, and at the same time a reciprocal movement of the clamping-jaws, as is done in some of the devices above mentioned, necessitates more complicated mechanical devices, as is evident.

Having thus described my invention, I wish to claim the following:

1. In a hair-pin machine, the combination of a reciprocally-moving wire-feeder which seizes the wire at the beginning of its forward stroke and pushes said wire forward into the holding and severing mechanism, releasing said wire at the beginning of its backward stroke, holding devices or chucks into which the wire is fed by the reciprocally-moving feeder, and which grip the wire simultaneously with the releasing of the same by the feeder, and which release said wire when the feeding device again seizes said wire, a cutting-tool that severs and double-points the wire simultaneously with the gripping of the same by the holding-chucks, and a bending-fork which engages with the severed length of wire and bends the same, substantially as set forth, while the feeding, holding, and severing devices are performing their work upon a succeeding length of wire, substantially as and for the purposes set forth.

2. In a hair-pin machine, the combination of a reciprocally-moving wire-feeder which seizes the wire at the beginning of its forward stroke and pushes said wire forward into the holding and severing mechanism, releasing said wire at the beginning of its backward stroke, holding devices or chucks into which the wire is fed by the reciprocally-moving feeder and which grip the wire simultaneously with the releasing of the same by the feeder, and which release the wire when the feeding device again seizes it, a cutting-tool that severs and double-points the wire simultaneously with the gripping of the same by the holding-chucks, a bending-fork which engages with the severed length of wire and bends the same, substantially as set forth, and shaping-dies which seize the bent pin and form the same while the feeding, holding, and severing devices are performing their work upon a succeeding length of wire, substantially as and for the purposes set forth.

3. In a hair-pin machine, the combination of a reciprocally-moving wire-feeder which seizes the wire at the beginning of its forward stroke and pushes said wire forward into the holding and severing mechanism, releasing said wire at the beginning of its backward stroke, holding devices or chucks into which the wire is fed by the reciprocating feeder and which grip the wire simultaneously with the releasing of the same by the feeder, and release said wire when the feeding device again seizes said wire, a cutting device or tool that severs and double-points the wire simultaneously with the gripping of the same by the holding-chucks, a bending-fork which engages with the severed length of wire and bends the same, substantially as set forth, shaping-dies which seize the bent pin and form the same while the feeding, holding, and severing devices are performing their work upon a succeeding length of wire, and a tripping-fork that removes the completed pin from the machine, substantially as and for the purposes set forth.

4. In a hair-pin machine, a wire-feeding device consisting of a reciprocally-moving carriage, a clamping-lever pivoted to said carriage, one end of which engages with said carriage, forming clamping-jaws between which the wire passes, the other end of said clamping-lever having an inclined projection thereon, a pivoted arm provided with pins engaging with the upper and lower sides of said inclined projection on the clamping-lever, a bracket in which said arm moves and which limits its movement, and a connecting-rod attached to said pivoted arm, all said parts being combined for the purposes set forth.

5. In a hair-pin machine, the combination, with wire-holding devices through which the wire passes and which seize and hold said wire firmly on each side of the cutting-point, of a cutter-head revolving around said holding devices and provided with a cutting-tool and means for giving said cutting-tool a reciprocal motion toward and from the axis of revolution of said head, for the purposes set forth.

6. In a hair-pin machine, the combination, with a revolving head provided with a cutting-tool moving toward and from the center of revolution of said head, of holding devices arranged contiguous to and on each side of the cutting-tool, each of said devices seizing and holding the wire firmly thereat, for the purposes set forth.

7. In a hair-pin machine, in combination, a revolving cutter-head, a stationary holding device or chuck about which said cutter-head rotates, a tool-plate moving reciprocally in the face of said rotating head, and a second holding device arranged adjacent to and independent of said cutter-head, for the purposes set forth.

8. In a hair-pin machine, the combination, with a revolving cutter-head, of a reciprocating slide or tool-plate moving toward and from the axis of revolution of said head, and in the face thereof an adjustable piece to which the actuating-lever is pivotally attached arranged in said tool-plate, and an actuating-lever pivoted to said head and attached to the adjustable piece in the tool-plate, for the purposes set forth.

9. In a hair-pin machine, the combination of a reciprocally-moving split tube through which the wire passes, having a beveled end, a stationary inclosing-tube having the inner surface of one end beveled, which corresponds to and engages with the beveled end of the inner tube, and actuating devices for imparting a reciprocal motion to said inner split tube, for the purposes set forth.

10. In a hair-pin machine, the combination of a reciprocally-moving split tube having a beveled end, a stationary inclosing-tube having the inner surface of one end beveled corresponding to and engaging with the beveled end of the inner tube, a pivoted lever engaging with and actuating the said split tube, a grooved cam operating said lever, and an actuating-shaft on which said cam is keyed, for the purposes set forth.

11. In a hair-pin machine, the combination, with a wire-holding device arranged on one side of the cutting-point, consisting of an outer stationary tube, a reciprocally-moving inner tube through which the wire passes directly, each of said tubes having correspondingly beveled and co operating ends, and mechanism for imparting a reciprocal motion to said split tube, of a second wire-holding device arranged on the opposite side of said cutting-point, consisting of a holding-lever engaging with a stationary bed between which the wire passes, and an actuating-cam engaging with said lever, all of said parts being arranged and operating for the purposes specified.

12. In a hair-pin machine, the combination, with wire holding devices arranged on each side of the cutting-point, consisting of an inner reciprocally-moving split tube, an inclosing-tube, both of which have co-operating beveled ends and actuating devices therefor, and a holding-lever engaging with a stationary bed, of a revolving cutter-head turning around the cutting-point and provided with a reciprocating tool-plate moving in said head and toward and from the center of revolution thereof, and actuating devices co-operating with said tool-plate to cause the movement thereof after the holding devices have seized the wire on opposite sides of the cutting-point, for the purposes set forth.

13. In a hair-pin machine, the combination of a revolving spindle, a cutter-head secured on and turning with said spindle and having a tool plate or slide moving reciprocally toward and from the center of revolution of said head and in the face thereof, a lever pivoted in said cutter-head and pivotally secured to the sliding tool plate by one end, the other end of said lever bearing on the incline on the sliding collar, a sliding collar moving reciprocally on said spindle and provided with an inclined surface upon which said pivoted lever bears, and mechanism for imparting a reciprocating motion to said collar, all said parts being arranged and operating for the purposes set forth.

14. In a hair-pin machine, in combination, a rotating spindle, a cutter-head secured to and turning with said spindle, a tool-plate moving in said head toward and from the center thereof, having an adjustable piece in one end thereof, a sliding collar moving reciprocally on said spindle and turning therewith, having an inclined surface thereon, a lever pivoted to said cutter-head, one end of said lever being pivotally secured to the adjustable piece in the tool-plate, the other end bearing on the inclined surface of the sliding collar, an operating-lever engaging with said collar, and a cam for actuating said lever, all said parts being arranged for the purposes set forth.

15. In a hair-pin machine, the combination of a rotating spindle having a feather thereon, a sliding collar having a groove to receive said feather and provided with a peripheral groove and an inclined surface, a bifurcated lever engaging with said peripheral groove in the collar, and a cam operating said lever, substantially as and for the purposes set forth.

16. In a hair-pin machine, in combination, a bending-table, a bending-pin projecting therefrom, a reciprocally-moving fork, the tines of which are rigid and stationary in relation to each other and which pass on each side of the bending-pin as the said fork moves reciprocally and push the wire against and around said bending-pin, and means for producing the reciprocal movement of said fork, for the purpose set forth.

17. In a hair-pin machine, in combination, a bending-table, a bending-pin projecting therefrom, a reciprocally-moving fork, the tines of which are rigid and stationary in relation to each other and which pass on each side of the bending-pin as the said fork moves reciprocally and push the wire against and around said bending-pin, an arm to which said fork is secured, provided with uprights, and a cam engaging with said uprights, substantially as and for the purposes set forth.

18. In a hair-pin machine, the combination, with the bending mechanism, of shaping devices consisting of a fixed die and dies engaging oppositely with said fixed die, having a reciprocal motion toward and from said fixed die and simultaneously therewith a rising-and-falling motion toward and from the fixed die, for the purposes set forth.

19. In a hair-pin machine, the combination of a fixed die, movable dies having a motion oppositely toward and from said fixed die and simultaneously therewith a rising-and-falling motion toward and from said fixed die, reciprocally-moving blocks to which said movable dies are secured, rods connecting said blocks with oppositely-formed eccentrics on the actuating-shaft, said oppositely-formed eccentrics, and a rocking frame in which said blocks slide, for the purpose set forth.

20. In a hair-pin machine, in combination, an inner longitudinally-moving split tube, means for operating said split tube, an outer stationary tube inclosing said split tube, said outer and inner tubes having beveled and co-operating ends, for the purpose set forth, a revolving spindle turning about said stationary inclosing-tube, means for causing the motion of said spindle, a head secured to and turning with said spindle, a slotted tool-plate moving reciprocally in said head across the axial line thereof, the face of said tool-plate being approximately in a line with the ends of the inner split tube and its stationary inclosing-tube which project into the slot in the tool-plate, a cutting-tool secured to said tool-plate, a sliding collar moving reciprocally on and turning with the spindle, said collar having an inclined surface thereon, means for producing said reciprocal movement of the sliding collar, and a tool-plate-actuating lever pivoted to the cutter-head, one end of said lever being pivotally connected with the tool-plate, the opposite end of said lever engaging with the inclined surface on the sliding collar, all said parts being arranged for the purposes set forth.

21. The combination, with the bending-table and bending mechanism, of a device for removing the completed pin from said table, consisting of a tripping-fork, between the tines or arms of which the ends of the pin are brought by the action of the bending mechanism, and means for operating said fork, for the purposes set forth.

22. The combination, with the bending-table and bending mechanism, of a device for removing the completed pin from said table, consisting of a tripping-fork arranged adjacent to said bending-table and turning pivotally in a suitable standard, an operating-lever connected with said fork, and a cam for actuating said lever, substantially as and for the purposes set forth.

In testimony that I claim the foregoing I have hereunto set my hand this 16th day of December, 1885.

WILLIAM H. JACKSON.

Witnesses:
    FREDK. F. CAMPBELL,
    CHARLES H. PELL.